United States Patent [19]
Kajiwara

[11] Patent Number: 5,960,116
[45] Date of Patent: *Sep. 28, 1999

[54] IMAGE PROCESSING APPARATUS AND METHOD FOR PERFORMING PREDICTION DATA ENCODING

[75] Inventor: Hiroshi Kajiwara, Inagi, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,213

[22] Filed: Oct. 31, 1996

[30] Foreign Application Priority Data

| | | | |
|---|---|---|---|
| Nov. 2, 1995 | [JP] | Japan | 7-285820 |
| Apr. 10, 1996 | [JP] | Japan | 8-088269 |

[51] Int. Cl.⁶ ................................................. H03M 7/40
[52] U.S. Cl. ............................................ 382/238; 382/239
[58] Field of Search ................................. 382/238–239, 382/232, 236; 348/408–409, 403–404

[56] References Cited

U.S. PATENT DOCUMENTS

| | | | |
|---|---|---|---|
| 5,500,678 | 3/1996 | Puri | 348/408 |
| 5,513,128 | 4/1996 | Rao | 382/232 |
| 5,550,847 | 8/1996 | Zhu | 348/409 |
| 5,563,593 | 10/1996 | Puri | 341/67 |

FOREIGN PATENT DOCUMENTS

| | | | |
|---|---|---|---|
| 0245621 | 11/1987 | European Pat. Off. | H04N 1/417 |
| 0272505 | 6/1988 | European Pat. Off. | H04N 7/137 |
| 0535571 | 4/1993 | European Pat. Off. | H04N 1/41 |
| 0755155 | 1/1997 | European Pat. Off. | H04N 7/34 |

OTHER PUBLICATIONS

"Fast and Efficient Lossless Image Compression", Howard, P.G. et al, Data Compression Conference, Mar. 30, 1993, pp. 351–360, XP000614252.

"Loco–I: A Low Complexity, Context Based, Lossless Image Compression Algorithm", Weinberger, M.J. et al, Data Compression Conference, Mar. 31, 1996, pp. 140–149, XP000617683.

Primary Examiner—David K. Moore
Assistant Examiner—Stephen Brinich
Attorney, Agent, or Firm—Fitzpatrick, Cella, Harper & Scinto

[57] ABSTRACT

A prediction error is effectively encoded in case of prediction encoding data by an information processor. A predictor predicts an objective pixel value, and a prediction error generation unit obtains a prediction error from the predictor. A statistics unit calculates, on the basis of a value of the prediction error, a statistical quantity of generation frequency in a plurality of cases corresponding to the value. A convertor converts the value of the prediction error on the basis of the statistical quantity, and an entropy encoder entropy encodes the converted prediction error.

37 Claims, 9 Drawing Sheets

FIG. 2

|   |    |    |    |
|---|----|----|----|
|   | n7 | n5 |    |
| n6| n2 | n1 | n3 |
| n4| n0 | X  |    |
|   |    |    |    |

X: OBJECTIVE PIXEL

FIG. 4

|   |    |    |    |
|---|----|----|----|
|   | S7 | S5 |    |
| S6| S2 | S1 | S3 |
| S4| n0 | *  |    |
|   |    |    |    |

*: POSITION OF ENCODING TARGET PIXEL

RELATIONSHIP BETWEEN SIGN JUDGING RESULT DATA AND PIXEL POSITION x: ENCODING TARGET PIXEL

FIG. 9

| VALUE e | BINARY REPRESENTATION | | BINARY REPRESENTATION | VALUE e' |
|---|---|---|---|---|
| 0 | 0 0 0 0 0 0 0 0 | ⟷ | 1 1 1 1 1 1 1 1 | −1 |
| 1 | 0 0 0 0 0 0 0 1 | ⟷ | 1 1 1 1 1 1 1 0 | −2 |
| 2 | 0 0 0 0 0 0 1 0 | ⟷ | 1 1 1 1 1 1 0 1 | −3 |
| ⋮ | ⋮ | | ⋮ | |

FIG. 10

| DIFFERENCE VALUE | LEVEL |
|---|---|
| 7 ··· | 3 |
| 3, 4, 5, 6 | 2 |
| 1, 2 | 1 |
| 0 | 0 |
| −1, −2 | −1 |
| −3, −4, −5, −6 | −2 |
| −7 ··· | −3 |

FIG. 11

| PREDICTION ERROR e | BINARY SYSTEM |
|---|---|
| ⋮ | ⋮ |
| −2 | 0001 |
| −1 | 01 |
| 0 | 1 |
| 1 | 001 |
| 2 | 00001 |
| ⋮ | ⋮ |

FIG. 12

| INTEGER VALUE | k = 0 | k = 1 | k = 2 |
|---|---|---|---|
| 0 | 1 | 01 | 001 |
| 1 | 01 | 11 | 011 |
| 2 | 001 | 001 | 101 |
| 3 | 0001 | 101 | 111 |
| 4 | 00001 | 0001 | 0001 |
| ⋮ | ⋮ | ⋮ | ⋮ |

FIG. 13

$$I(e') \begin{cases} -2e-1 & \text{FOR } e' < 0 \\ 2e' & \text{FOR } e' \geq 0 \end{cases}$$

FIG. 14

| STATE NUMBER S: {q(a−c), q(b−c)} | PARAMETER k |
|---|---|
| 0: (−3, −3) | 7 |
| 1: (−3, −2) | 6 |
| 2: (−3, −1) | 5 |
| 3: (−3, 0) | 3 |
| 4: (−3, 1) | 5 |
| 5: (−3, 2) | 6 |
| 6: (−3, 3) | 7 |
| 7: (−2, −3) | 6 |
| 8: (−2, −2) | 5 |
| 9: (−2, −1) | 4 |
| 10: (−2, 0) | 2 |
| 11: (−2, 1) | 4 |
| 12: (−2, 2) | 5 |
| 13: (−2, 3) | 6 |
| 14: (−1, −3) | 5 |
| 15: (−1, −2) | 4 |
| 16: (−1, −1) | 2 |
| 17: (−1, 0) | 1 |
| 18: (−1, 1) | 2 |
| 19: (−1, 2) | 4 |
| 20: (−1, 3) | 5 |
| 21: ( 0, −3) | 3 |
| 22: ( 0, −2) | 2 |
| 23: ( 0, −1) | 1 |
| 24: ( 0, 0) | 0 |
| 25: ( 0, 1) | 1 |
| 26: ( 0, 2) | 2 |
| 27: ( 0, 3) | 3 |
| ( 1, 3) | 5 |
| | 4 |
| 45: | |
| 46: (−2, −3) | |
| 47: (−2, −3) | 6 |
| 48: (−2, −3) | 7 |

FIG. 15

| PREDICTION ERROR e | HUFFMAN CODE |
|---:|:---|
| 0 | 1 |
| 1 | 01 |
| −1 | 001 |
| 2 | 0001 |
| −2 | 00001 |
| 3 | 000001 |
| ⋮ | ⋮ |

– 1 –

IMAGE PROCESSING APPARATUS AND METHOD FOR PERFORMING PREDICTION DATA ENCODING

BACKGROUND OF THE INVENTION

1. Field of the Invention

The present invention relates to image processing apparatus and method for performing data encoding.

2. Related Background Art

Conventionally, a prediction encoding method has been proposed as one of image encoding methods which is used in an information processing apparatus. The prediction encoding method is a method to predict a pixel value of an encoding target pixel from peripheral pixel values and to perform entropy encoding of a prediction error.

However, such the conventional prediction encoding method has still room for improvement if encoding efficiency in case of performing the entropy encoding of the prediction error is considered.

SUMMARY OF THE INVENTION

In one aspect of the invention, an information processor includes a predictor which predicts an objective pixel value, and a prediction error generator obtains a prediction error by the predictor. Also included are a statistics unit which calculates, on the basis of a value of the prediction error, a statistical quantity of generation frequency corresponding to the value, and a convertor which converts the value of the prediction error on the basis of the statistical quantity. Lastly included is an entropy encoder which entropy encodes the prediction error converted by the convertor, wherein the conversion by the convertor is a symmetric transformation using a predetermined prediction error value as a center.

In another aspect of the invention, an information processor includes a predictor which predicts an objective pixel value, and a prediction error generator obtains a prediction error by the predictor. Also included are a statistics unit which calculates, on the basis of a value of the prediction error, a statistical quantity of generation frequency corresponding to the value, and a conversion unit which converts the value of the prediction error on the basis of the statistical quantity. Lastly included are an entropy encoder which entropy encodes the prediction error converted by the convertor, and a controller which performs controlling such that the prediction error by the predictor becomes a predetermined error other than "0".

The above and other objects of the present invention will be apparent from the following detailed description in conjunction with the attached drawings.

BRIEF DESCRIPTION OF THE DRAWINGS

FIG. 2 is a view showing a positional relationship between an encoding target pixel and peripheral pixels;

FIG. 4 is a view showing a pixel position of a binary judging result to be utilized in generating a context (state number S of peripheral pixels);

FIG. 9 is a view showing an area converting process in an area conversion circuit 111, in case of parameter k>0;

FIG. 10 is a view showing a quantizing method for a prediction error;

FIG. 11 is a view showing converting into a binary system in an arithmetic encode circuit 116;

FIG. 12 is a view for explaining Golomb-Rice encoding in case of parameter k=0, 1 and 2;

FIG. 13 is a view showing a value of I(e) which is subjected to the Golomb-Rice encoding;

FIG. 14 is a view showing correspondence between the state number S and the parameter k; and FIG. 15 is a view showing a Huffman table to be used in the first and second embodiments.

DETAILED DESCRIPTION OF PREFERRED EMBODIMENTS

(First Embodiment)

Hereinafter, the first embodiment of the present invention will be explained in detail with reference to the accompanying drawings.

Figure 1:
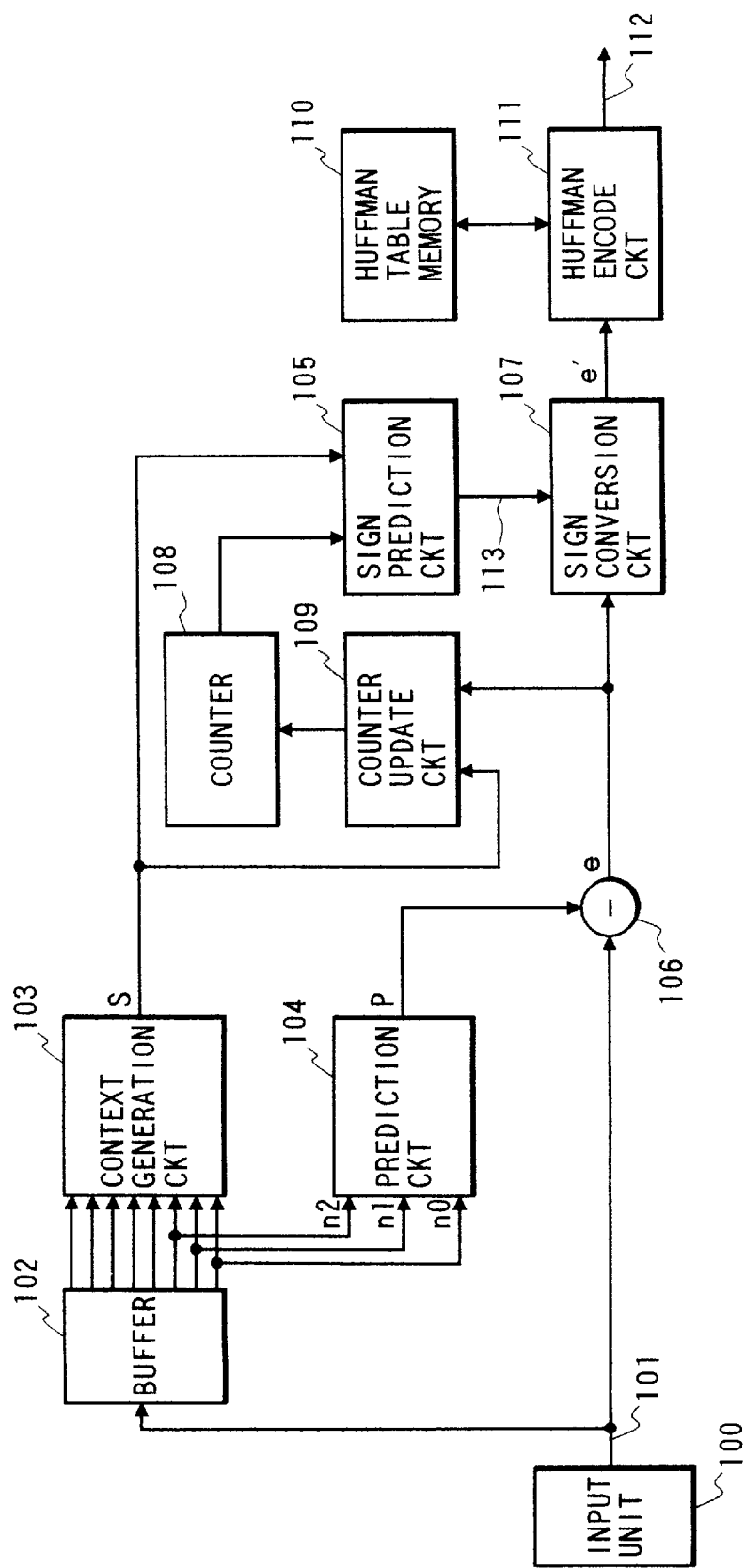
FIG. 1 is a block diagram for explaining a first embodiment of the present invention.

FIG. 1 is a block diagram showing the first embodiment of the present invention. In FIG. 1, reference numeral 100 denotes an input unit for inputting a signal, reference numeral 101 denotes a signal line for transmitting the signal, and reference numeral 102 denotes a buffer for storing image data corresponding to three lines.

Reference numeral 103 denotes a context generation circuit for generating a context from pixel values of peripheral pixels, and reference numeral 104 denotes a prediction circuit for generating a prediction value from the pixel values of the peripheral pixels.

Reference numeral 105 denotes a sign prediction circuit for predicting a sign (±) of a prediction error, and reference numeral 106 denotes a subtraction circuit.

Reference numeral 107 denotes a sign conversion circuit, reference numeral 108 denotes a counter, reference numeral 109 denotes a counter update circuit, reference numeral 110 denotes a memory for a Huffman table, reference numeral 111 denotes a Huffman encode circuit, and reference numerals 112 and 113 denote signal lines.

In the present embodiment, the image data to be encoded will be explained as an eight-bit (255-level pixel value) monochromatic image.

It is assumed in the present embodiment that a standard Huffman table by which encoding efficiency is supposed to be improved has been stored in the memory 111, on the basis of statistics of the prediction errors obtained when several standard images have been previously encoded by using the unit and circuits 100 and 102 to 109. In an encoding process of the present embodiment, the Huffman table is shown in FIG. 15. That is, if prediction errors e and -e are compared with each other, a code length of the prediction error e is shorter than that of the prediction error -e.

Further, all data to be held in the counter 108 is initialized to "0".

Hereinafter, each of the above circuits will be explained in detail.

Initially, the image data of an encoding target pixel is sequentially input from the input unit 100 in order of raster scanning, and then output to the buffer 102 and the subtraction circuit 106 via the signal line 101.

The buffer 102 stores the image data corresponding to the line of the encoding target pixel and the previous two lines, i.e., corresponding to the three lines, from among the image data input from the signal line 101.

The context generation circuit 103 fetches from the buffer 102 the image data corresponding to peripheral pixels n0 to n7 (see positional relationship of pixels in FIG. 2) of the encoding target pixel. Subsequently, an average value n of the image data (pixel value) corresponding to the peripheral pixels n0 to n7 is obtained so as to obtain values b0 to b7 (binary one-bit data) which are generated by respectively binarizing the image data corresponding to the peripheral pixels n0 to n7 using the average value n as a threshold value. An eight-bit state number S in which one-bit data corresponding to the values b0 to b7 are allocated sequentially from the most significant bit (MSB) is generated, and then output as a state number of the encoding target pixel to the sign prediction circuit 105 and the counter update circuit 109 for each pixel. By such state number S, a state of the peripheral pixel value is represented by eight-bit data.

On the other hand, in the prediction circuit 104, the peripheral pixels n0 to n2 of the encoding target pixel are fetched from the buffer 102, and a prediction value P for an encoding target pixel X is obtained by the following equation:

$$P = n0 + n1 - n2 \text{ (n0, n1, n2: eight-bit data)}$$

In this case, the obtained prediction value P is output to the subtraction circuit 106.

On the basis of data representing the state S output from the context generation circuit 103, the sign prediction circuit 105 fetches from the counter 108 the number of times (Sn) that such the state S is generated and the number of times (S_minus) that the prediction error had a negative value in such state S.

In this case, if the number of times (Sn-S_minus) (i.e., the number of times that the prediction error had a positive value in the state S) is less than S_minus, "1" is output on the signal line 113. On the other hand, if Sn-S_minus is equal to or larger than S_minus, "0" is output on the signal line 113.

The subtraction circuit 106 generates the prediction error e by using the equation (e=X−P) and outputs it. In this case, the reference symbol P denotes an objective pixel (i.e., pixel to be remarked).

In a case where an input value from the signal line 113 is "0", the sign conversion circuit 107 outputs as a corrected prediction error e' the prediction error e as is. On the other hand, in a case where the input value from the signal line 113 is "1", the sign conversion circuit 107 outputs as the corrected prediction error e' the prediction error -e which is obtained by converting the sign of the prediction error e.

The counter 108 stores the value Sn which is obtained by summing the number of generation of the state S of the image data of the peripheral pixels (n0 to n7) in a case where each of the already-encoded pixels is set as the encoding target pixel. Further, the counter 108 stores the number of times (S_minus) that the prediction error e generated when each encoding target pixel was encoded had the negative (−) value, in correspondence with each state S.

In the above explanation, since the number of the state S is $2^8$, the number of generation (Sn) is correspondingly $2^8$ and the number of S_minus is similarly $2^8$.

The counter update circuit 109 controls the counter 108 such that the values Sn and S_minus stored in the counter 108 are subjected to being incremented every time one pixel is encoded. That is, the value Sn is subjected to being incremented in response to the data of the state S output from the context generation circuit 103, and the value S_minus is subjected to being incremented in response to the data of the prediction error e output from the subtraction circuit 106.

The Huffman encode circuit 111 fetches from the Huffman table memory 110 a code corresponding to the corrected prediction error e' and outputs it to the signal line 112.

The above process is repeated until inputting of the image data from the signal line 101 terminates.

According to the present embodiment, on the basis of the statistical quantity of the prediction error corresponding to the already-encoded pixel, the positive and negative signs of the prediction error is inverted such that the short code length can be allocated to the prediction error value of which appearance frequency is high, and thus the prediction error of which positive and negative signs have been controlled is entropy encoded, so that the prediction encoding can be effectively performed.

Further, according to the present embodiment, effective allocating of the code length can be performed by using a simple structure for counting the number of appearance of the positive and negative signs of the prediction error.

(Second Embodiment)

Figure 3:
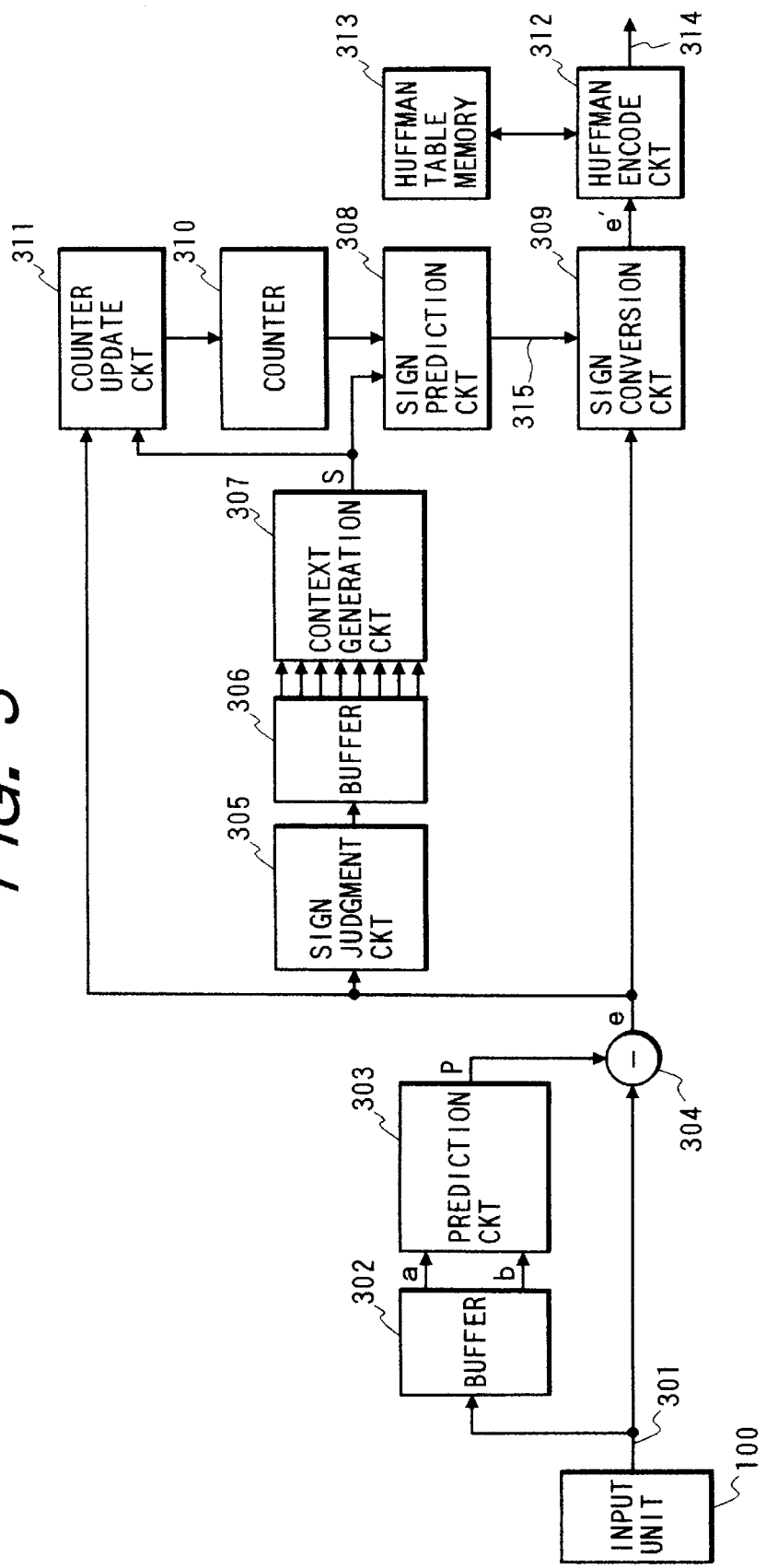
FIG. 3 is a block diagram for explaining a second embodiment of the present invention.

FIG. 3 is a block diagram showing the second embodiment of the present invention.

In FIG. 3, reference numeral 100 denotes an input unit, reference numeral 301 denotes a signal line, reference numeral 302 denotes a buffer for storing image data corresponding to two lines, reference numeral 303 denotes a prediction circuit for generating a prediction value for an encoding target pixel from peripheral pixels, reference numeral 304 denotes a subtraction circuit, reference numeral 305 denotes a sign judgment circuit, reference numeral 306 denotes a buffer for storing a sign judging result, reference numeral 307 denotes a context circuit for generating a context used for sign predicting, reference numeral 308 denotes a sign prediction circuit for predicting a sign of a prediction error, reference numeral 309 denotes a sign conversion circuit, reference numeral 310 denotes a counter, reference numeral 311 denotes a counter update circuit, reference numeral 312 denotes a Huffman encode circuit, reference numeral 313 denotes a Huffman table memory, and reference numeral 314 denotes a signal line.

Like the first embodiment, a case will be explained in the present embodiment where an eight-bit monochromatic image data is encoded. Therefore, only a portion concerning a data processing function which is different from that in the first embodiment will be explained in detail.

Like the first embodiment, it is assumed in the present embodiment that a standard Huffman table by which encoding efficiency is supposed to be improved has been stored in the Huffman table memory 313, on the basis of statistics of the prediction errors obtained when several standard images were previously encoded by using the unit and circuits 100 and 302 to 311. In an encoding process of the present embodiment, the Huffman table shown in FIG. 15 is used.

Further, all data to be held in the counter 310 is initialized to "0".

Hereinafter, each of the above unit and circuits will be explained in detail. Initially, a pixel value X which is an encoding target is input from outside to the signal line 301 in order of raster scanning. The buffer 302 stores a signal corresponding to a line of the encoding target pixel and its previous one line, i.e., corresponding to the two lines. In this case, the signal is input from the signal line 301.

Figure 5:
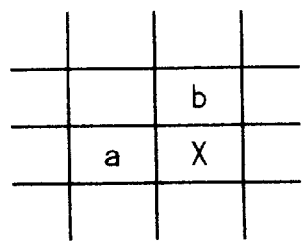
FIG. 5 is a view for explaining a prediction encoding method in the second embodiment of the present invention.

The prediction circuit 303 fetches, from the buffer 302, image data a of a pixel immediately preceding the encoding target pixel X and image data b of a pixel on a line before a line of the pixel X by one (i.e., immediately upper pixel), obtains a prediction value P from an equation (P=(a+b)/2) and outputs it. In this case, respective positions of the data a and b are shown in FIG. 5.

The subtraction circuit 304 generates a prediction error e by using the prediction value P and the encoding target pixel value X such that an equation (e=X−P) is satisfied, and then outputs it.

The sign judgment circuit 305 judges a sign of the prediction error e output from the subtraction circuit 304, and outputs "0" in a case where the sign is negative (−) and outputs "1" in a case where the sign is positive (+). The buffer 306 stores binary data, generated by the sign judgment circuit 305, corresponding to the line of the encoding target pixel and its previous two lines, i.e., corresponding to the total three lines.

The context generation circuit 307 fetches eight bit binary data S0 to S7 (see positional relationship shown in FIG. 4), and generates an eight-bit state number S (state S) by sequentially allocating the fetched binary data in order of most significant bit (MSB).

The sign prediction circuit 308 fetches from the counter 310 the number of times (S_minus) that the prediction error e was negative in the state S and the number of times (S_plus) that the prediction error e was positive except for "0". If S_minus>S_plus, the sign prediction circuit 308 outputs "1" to a signal line 315, while if other than S_minus>S_plus, the sign prediction circuit 308 outputs "0".

In a case where "0" is input from the signal line 315, the sign conversion circuit 309 outputs as a corrected prediction error e' the prediction error e as is which is output from the subtraction circuit 304. On the other hand, in a case where "1" is input from the signal line 315, the sign conversion circuit 309 outputs as the corrected prediction error e' a prediction error −e which is obtained by converting the sign of the prediction error e.

The counter 310 stores therein S_minus and S_plus.

In the counter update circuit 311, S_minus held in the counter 310 is subjected to being incremented in a case where the prediction error e has a negative (−) value, while S_plus is subjected to being incremented in a case where the prediction error e has a positive (+) value other than "0". On the other hand, there is no incrementing in a case where the prediction error e is "0".

In such an incrementing process, in a case where S_minus or S_plus reaches a constant value "alpha" (i.e., upper limit value), the value to be held in the counter 310 is maintained to be equal to or less than the constant value "alpha" by dividing both S_minus and S_plus by "2".

The Huffman encode circuit 312 fetches a Huffman code corresponding to the corrected prediction error e' from the Huffman table memory 313 and then outputs it to the signal line 314.

The above process is repeated until final image data is input into the input unit 100.

According to the present embodiment, the same effects can be derived as those derived in the first embodiment.

Further, since the state number S is produced by using the positive and negative signs of the prediction error, the process itself is more easy as compared with that in the first embodiment.

(Third Embodiment)

Hereinafter, the third embodiment will be explained in detail with reference to the drawings.

Figure 6:
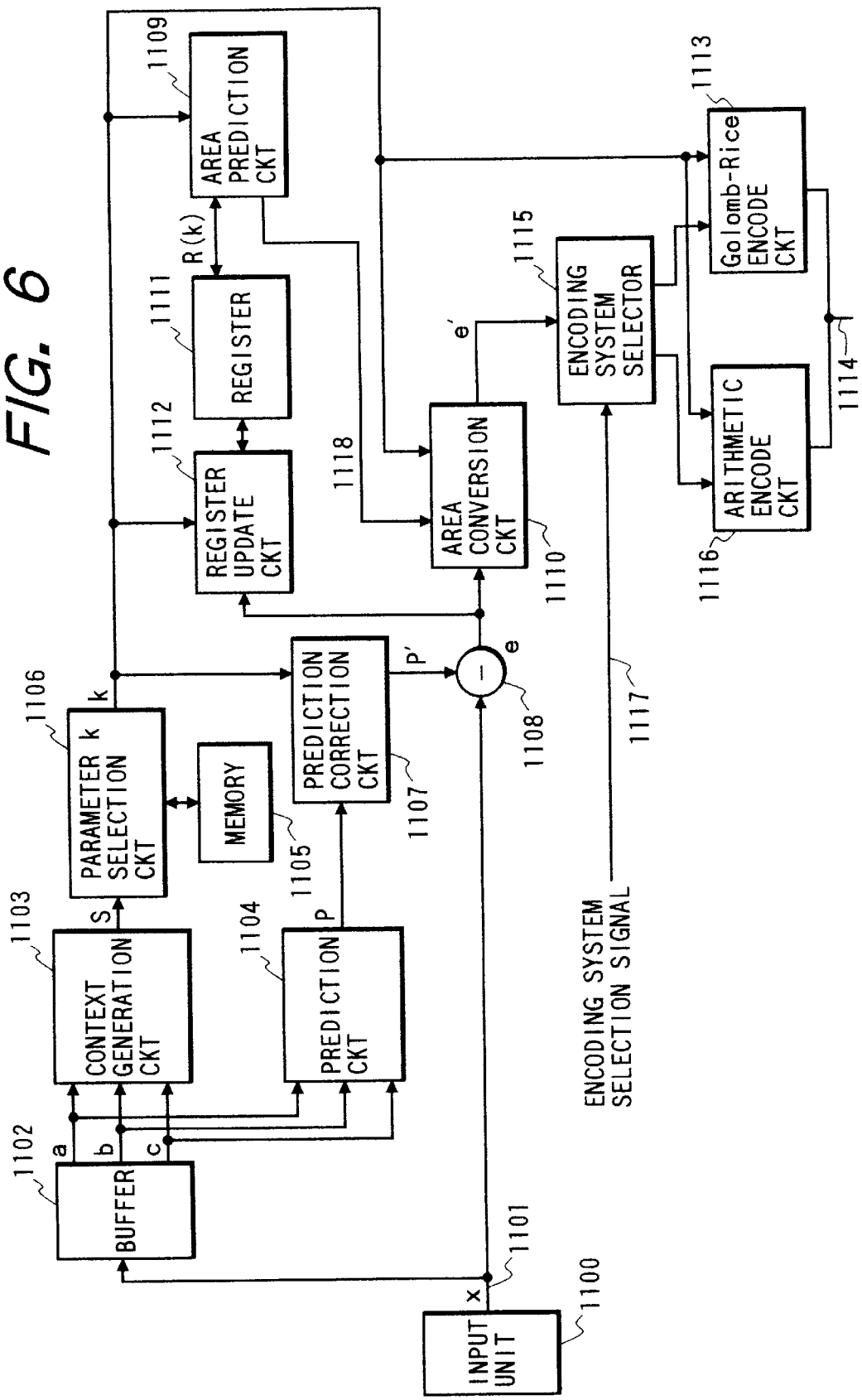
FIG. 6 is a block diagram for explaining a third embodiment of the present invention.

FIG. 6 is a block diagram concerning the third embodiment.

In FIG. 6, reference numeral 1100 denotes an input unit for inputting image data, reference numeral 1101 denotes a signal line, reference numeral 1102 denotes a buffer for storing the image data corresponding to two lines, reference numeral 1103 denotes a context generation circuit for generating a context from peripheral pixels, reference numeral 1104 denotes a prediction circuit for generating a prediction value P of an encoding target pixel from the peripheral pixels, reference numeral 1105 denotes a memory for holding or storing a Golomb-Rice parameter k for each context, reference numeral 1106 denotes a parameter-k selection circuit for selecting the parameter k, reference numeral 1107 denotes a prediction correction circuit for correcting the prediction value P into a prediction value P', reference numeral 1108 denotes a subtraction circuit for subtracting the prediction value P' from the image data of the encoding target pixel, reference numeral 1109 denotes an area prediction circuit for performing area predicting to be described later, reference numeral 1110 denotes an area conversion circuit for converting a prediction error e output from the subtraction circuit 1108 into a prediction error e' through processing to be described later, reference numeral 1111 denotes a register for storing eight area judgment values R(k) to be described later, reference numeral 1112 denotes a register update circuit for updating the values R(k) stored in the register 1111, reference numeral 1113 denotes a Golomb-Rice encode circuit for performing Golomb-Rice encoding to be described later, reference numeral 1114 denotes a signal line for outputting encoded data, reference numeral 1115 denotes an encoding system selector for performing controlling to select an encoding system, reference numeral 1116 denotes an arithmetic encode circuit for performing arithmetic encoding, reference numeral 1117 denotes a signal line for transmitting an encoding system selection signal, and reference numeral 1118 denotes a signal line for outputting a control signal to be used for controlling the converting of the prediction error e by the area conversion circuit 1110.

Hereinafter, an outline of the entire processing which includes mainly the Golomb-Rice encoding used in the present embodiment will be explained.

A target of the Golomb-Rice encoding is a non-negative integer of which the probability distribution is reduced in one direction, such as in run-length encoding of binary data. A code word to be allocated to the non-negative integer varies in accordance with the parameter k (k is a non-negative integer value) which is set according to reduction degree of appearance probability.

Figure 8:
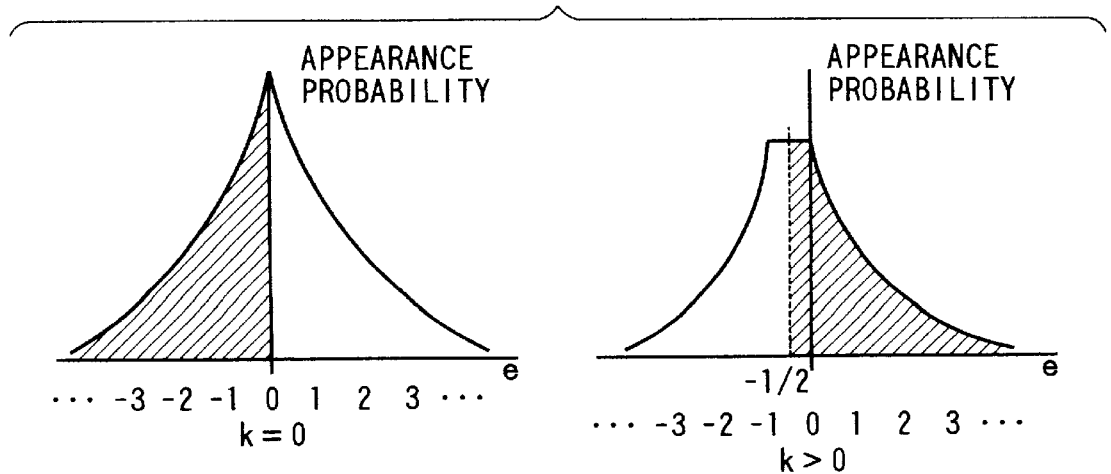
FIG. 8 is a view showing an area dividing method in case of parameter k=0 and in case of parameter k>0.

In a direction from a value at which the prediction error is easiest to generate (highest appearance probability value) (corresponding to e=0, −½ in each histogram of FIG. 8) to a value at which the prediction error is difficult to generate (lowest appearance probability value) (corresponding to rightward and leftward values from e=0, −½ in each histogram of FIG. 8), in a case where the reduction of appearance probability is abrupt, the parameter k has a small value. On the other hand, in a case where the reduction of appearance probability is slow, the parameter k has a large value. An encoding procedure by the Golomb-Rice encoding of a non-negative integer value N in a case where the parameter k is given will now be explained.

Initially, the non-negative integer value N which is the encoding target is represented in binary notation, and obtained data is then divided into two bit portions, i.e., a least k-bit portion and a remaining most bit portion. Subsequently, "0" is added to the least k-bit portion by the number obtained by representing the remaining most bit portion in decimal notation, and then "1" is last added to form the encoding word. For example, in case of k=2, N=13, the least two bits "01" of the binary representation "1101" of N is added with numerals represented by the remaining most bit portion "11", i.e., three "0", to obtain "01000", and "1" is last added to form or produce the encoding word "010001".

FIG. 12 shows relationship between the non-negative integer value and the encoding word in case of the parameter k=0, 1 and 2. In order to apply this Golomb-Rice encoding to the encoding of the prediction error e having the probability distribution which reduces in both the positive and negative directions, mapping the prediction error e to the nonnegative integer value is needed.

For example, a method is used in which the prediction error e is mapped to the non-negative integer values 0, 1, 2, 3, 4, 5, 6, . . . in order of 0, −1, 1, −2, 2, −3, 3, . . . , and a result of such mapping is subjected to the Golomb-Rice encoding. In the Golomb-Rice encoding, since $2^k$ symbols are given with the same-length code, the short-length code is allocated entirely to the negative (−) portion rather than the positive (+) portion when performing such the mapping.

In other words, in a case where the parameter k in the Golomb-Rice encoding satisfies k>0, the code length is symmetrically allocated from a central value at which the prediction error e is "−½".

In correspondence with such allocating, if the center of the prediction error occurrence distribution is shifted by −½, a code quantity reduces. Therefore, shifting the prediction error occurrence distribution by using various methods as needed (e.g., correcting the prediction value such that an average value of the prediction errors is within a range "0" to "−½", and the like).

On the other hand, sign predicting such as explained in the first embodiment is applicable as one of entropy reducing methods in prediction encoding. In the sign predicting, a sign (+) or (−) of the prediction error of the encoding target pixel is predicted on the basis of statistics of the sign of the prediction error corresponding to an already-encoded pixel, and then necessary sign converting is performed according to a predicted result, whereby one of the signs (+) and (−) is biased to reduce entropy.

In a case of operating such that a center of occurrence distribution of the prediction errors comes to "−½", even if the sign is inverted by predicting the positive and negative signs such as in the first and second embodiments, naturally the number of occurrence of the negative (−) sign becomes numerous. Therefore, merely the sign of the negative (−) prediction errors are all inverted into positive (+) even by such sign converting based on the sign predicting as in the first and second embodiments, whereby the essential sign inverting is meaningless. That is, in the case of operating such that the center of occurrence distribution of the prediction errors comes to "−½", if a center of the inverting (or converting) of the prediction error is not set as "−½", the above-described processing effect cannot be derived.

Therefore, the present embodiment provides an encoding method which takes account of the above case. Hereinafter, the encoding method in the present embodiment will be explained in detail.

A processing flow performed by the structure shown in FIG. 6 will now be explained.

Here, an example, a case where an eight-bit (having values 0 to 255) monochromatic image data is encoded is explained. In this case, it is assumed that the value of the parameter k which was previously tested for several images and is suitable for each state number S (context) has been stored in the memory 1105.

FIG. 14 shows an example of a correspondence table between the state number S and the parameter k stored in the memory 1105. The memory 1105 refers to this correspondence table by using the input state number S, to output the corresponding parameter k.

The register 1111 holds or stores the area judgment value R(k) for each parameter k (k=0 to 7 in the present embodiment), but all of such counted values have been initialized to "0". The area judgment value R(k) will be described in detail later.

In the present embodiment, the Golomb-Rice encoding performed by the Golomb-Rice encode circuit 1113 and the arithmetic encoding performed by the arithmetic encode circuit 1116 are applied as entropy encoding systems, and thus a user may select either one of these two encoding as occasion demands.

Before performing the entropy encoding, an encoding system selection signal is supplied from outside of the apparatus via the signal line 1117. The encoding system selection signal gives "0" in case of using the arithmetic encoding, and gives "1" in case of using the Golomb-Rice encoding.

Hereinafter, operation of each process unit will be explained in turn.

Initially, image data of the encoding target pixel is input from the input unit 1100 in order of raster scanning, and then input into the buffer 1102 and the subtraction circuit 1108 via the signal line 1101.

Figure 7:
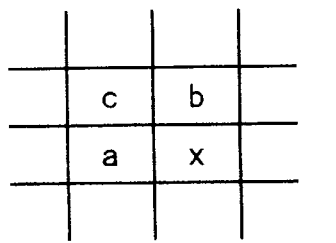
FIG. 7 is a view showing a positional relationship between an objective pixel and peripheral pixels.

The buffer 1102 receives the image data input from the signal line 1101 and stores the image data corresponding to two lines. Then, image data corresponding to peripheral pixel values a, b and c (see positional relationship of pixels shown in FIG. 7) of the encoding target pixel are input from the buffer 1102 into the context generation circuit 1103.

Subsequently, the context generation circuit 1103 calculates difference values (a−c) and (b−c), to obtain values q(a−c) and q(b−c) by quantizing the difference values respectively into seven levels in accordance with a correspondence table between the difference value and the level shown in FIG. 10. By a combination of these two values q(a−c) and q(b−c), the context generation circuit 1103 generates and outputs the state number S (S=0 to 48) representing 49 states shown in FIG. 14. In the present embodiment, the state number S is obtained by the equation S=(q(a−c)+3)×7+q(b−c)+3.

The peripheral pixel values a, b and c of the encoding target pixel are input from the buffer 1102 into the prediction circuit 1104. Then, the prediction circuit 1104 obtains the prediction value P for an encoding target pixel x by using an equation P=a+b−c.

The parameter k selection circuit 1106 reads and outputs the parameter k corresponding to the state number S generated by the context generation circuit 1103, on the basis of the correspondence table between the state number S and the parameter k stored in the memory 1105.

The prediction correction circuit 1107 outputs, as the prediction value P', the prediction value P as it is in a case where the input parameter k is "0".

In a case where the parameter k is not "0", the prediction correction circuit 1107 adds correction value M(k) to the prediction value P, and outputs the obtained prediction value P' to the subtraction circuit 1108. An initial value of this correction value M(k) is "0" and is updated or renewed by an equation M(k)−1−M(k). That is, the correction value M(k) repeats "0" and "1" by turns.

The subtraction circuit 1108 produces or generates the prediction error e by an equation e=x−P'. The area prediction circuit 1109 reads out the area judgment value R(k) held in the register 1111, on the basis of the input parameter k. For example, if k=2, the area prediction circuit 1109 reads out a value R(2). Details of the area judgment value R(k) will be described as follows.

The area judgment value R(k) is a count value representing which one of an oblique-line area and a nonoblique-line area both shown in FIG. 8 includes a larger number of prediction errors. In this case, the prediction errors are prediction errors previous to the already-encoded pixel and occurred in respective cases of the parameter k (k=0 to 7). Further, the oblique-line area represents an area in which the prediction error is an integer equal to or less than "−1" in case of k=0, while represents an area in which the prediction error is an integer equal to or larger than "0" in case of k>0. On the other hand, the nonoblique-line area represents an area in which the prediction error is an integer equal to or larger than "1" in case of k=0, and represents an area in which the prediction error is an integer equal to or less than "−1" in case of k>0. If R(k)>0, the area prediction circuit 1109 predicts that the prediction error for the encoding target pixel exists in the nonoblique-line area, and then outputs a control signal "1" to the signal line 1118 to instruct the area conversion circuit 1110 to perform the area converting.

On the other hand, if R(k)<0, the area prediction circuit 1109 predicts that the prediction error for the encoding target pixel exists in the oblique-line area, and then outputs a control signal "0" to the signal line 1118 to instruct the area conversion circuit 1110 not to perform area converting.

The area conversion circuit 1110 converts the prediction error e in a method according to the parameter k, in response to the control signal "1" or "0" input from the signal line 1118.

That is, if the control signal is "0", the area conversion circuit 1110 outputs as the prediction error e' and the prediction error e input from the subtraction circuit 1108 as is. On the other hand, if the control signal is "1", the area conversion circuit 1110 performs the area converting of the prediction error e and then outputs the converted prediction error as the prediction error e'. A method for such area converting differs from each other according to the case of whether parameter k is "0" or not "0".

If the parameter k is "0", the sign of the prediction error e is simply inverted and then output, i.e., e'=−e.

On the other hand, if the parameter k is not "0", inverting processing is performed in a binary representation of the prediction error e as shown in FIG. 9. That is, the new prediction error e' (e'=−e−1) which was mapped (i.e., symmetric transforming) to a target area by using a central point of the prediction error e=−½ is output.

According to the above processing, the prediction error of which occurrence frequency is high is mapped in order of integer values (e.g., integer values shown in FIG. 12 or the like) 0, 1, 2, 3, . . . , which integer values are used in case of performing the entropy encoding to be described later.

Although the explanation lacks for sequence, in the above processing (i.e, processing for outputting the control signal 1118 from the area prediction circuit 1109), the register update circuit 1112 updates the area judgment value R(k) corresponding to the parameter k used in the above processing, from among the values R(k) held in the register 1111.

Concretely, e.g., in a case where the parameter k=0 is input, if the prediction error e previous to the area converting is equal to or larger than "1", the area judgment value R(k=0) is subjected to incrementing, and if equal to or less than "−1", the value R(k=0) is subjected to decrementing. (If the prediction error e is "0", nothing is performed.) On the other hand, in a case where the parameter k is other than "0", if the prediction error e previous to the area converting is equal to or less than "−1", the area judgment value R(k) (k=either one of 1 to 7) is subjected to incrementing, while if equal to or larger than "0", the value R(k) (k=either one of 1 to 7) is subjected to decrementing.

The area judgment value R(k) which was updated in the above processing is used in processing of the continuous encoding target pixel and following processing. That is, the above encoding processing is performed in units of a pixel.

Subsequently, if the encoding system selection signal input from the outside of apparatus via the signal line 1117 is "0", the encoding system selector 1115 inputs the prediction error e' output from the area conversion circuit 1110 into the arithmetic encode circuit 1116. On the other hand, if the encoding system selection signal is "1", the encoding system selector 1115 controls the entropy encoding such that the prediction error e' is input into the Golomb-Rice encode circuit 1113.

In a case where the arithmetic encoding is selected as the encoding system, the arithmetic encode circuit 1116 converts the prediction error e' into a binary system by using the input parameter k, and then performs binary arithmetic encoding of converted data.

In the present embodiment, a QM-Coder which is used in a JBIG system is used as a binary arithmetic encoding system. The arithmetic encode circuit 1116 may not only use the binary arithmetic encoding but also known multivalue arithmetic encoding.

The above converting into the binary system is performed by last adding "1" to 2e "0" if the prediction error e is positive (+), while by adding "1" to (−2e−1) "0" if the error e is negative (−).

FIG. 11 shows an example of converting into the binary system. The produced or generated binary system is state-divided according to the parameter k generated by the parameter k selection circuit 1106 and the bit number n from a top of the binary system, to be subjected to the binary arithmetic encoding. Then, a generated code system is output to the signal line 1114.

On the other hand, in a case where the Golomb-Rice encoding is selected as the encoding system, the Golomb-Rice encode circuit 1113 converts the prediction error e' output from the area conversion circuit 1110 based on the input parameter k, into a non-negative integer value I(e') by using an equation shown in FIG. 13, and then performs the Golomb-Rice encoding for the value I(e') by using the parameter k to output encoded data to the signal line 1114.

The encoding is performed by repeating the above processing until the final pixel is input from the signal line 1101.

According to the above processing, the code system (or series) corresponding to the encoding system selected responsive to the encoding system selection signal supplied from the signal line 1117 can be changed to be generated or produced.

(Other Embodiment)

The present invention is not limited to the above embodiments. For example, as the predicting method of the objective (or remarked) pixel value, a method may be applied in which a previous value is simply predicted. On the other hand, several predicting methods may be provided to be appropriately changed or switched.

Further, in the present invention, the Golomb-Rice encoding, the arithmetic encoding and the Huffman encoding are used as the entropy encoding. However, other entropy encoding may be used. In the third embodiment, if such other encoding is used in parallel with the above encoding, the present invention can cope with numerous encoding efficiencies and encoding speed.

Furthermore, in the above embodiments, an encoding method was described corresponding to the cases where the center of the prediction error distribution is "0" and "–½". However, an encoding method corresponding to other cases can be applied in the same manner as in the case of "–½".

Furthermore, the present invention is not limited to the above first, second and third embodiments. For example, as the predicting method of the encoding target pixel value, a method may be applied in which a previous value is simply predicted. On the other hand, several predicting methods may be provided to be appropriately changed or switched.

According to the present invention, since the value of the prediction error is changed once based on the statistical quantity of the prediction errors corresponding to the already-encoded pixels and thereafter the changed prediction error is encoded, the prediction error to be used in the prediction encoding can be effectively encoded.

Of course, since the same processing is performed at a decoding side (i.e., the processing for returning change in the prediction error to an original state on the basis of a statistical quantity of an already-decoded prediction error) as that in an encoding side, decoding can be correctly performed.

Especially, in the present invention, such effective encoding can be easily performed by a simple system in which the prediction error e is symmetrically converted into the prediction error e' by using the predetermined prediction error as a center.

Further, the encoding can e effectively performed when the method is provided for effectively encoding the prediction error the method in which two cases are set, in one case the sign of the prediction error is positive (+) while in the other case the sign is negative (–), and then the encoding is performed in each of these two cases.

Furthermore, in the present invention, since the prediction error for the encoding target pixel is encoded based on the statistical quantity of the prediction error for the already-encoded pixel, the real-time encoding can be performed. Therefore, there is no need to store large-quantity image data and to scan the image by using a scanner a plurality of times.

Furthermore, by providing the plurality of entropy encoding systems (e.g., encoding system of which encoding speed is low but encoding efficiency is high, and encoding system of which encoding speed is high but encoding efficiency is not so high), the encoding system corresponding to the desired encoding efficiency and encoding speed can be selected according to circumstances.

Furthermore, since this is achieved simply by counting the number of appearance which of the number of appearance of larger values and the number of appearance of smaller values is numerous by using as a boundary the value (i.e., "0" in the first or second embodiment, and "0" or "–½" in the third embodiment) which centers when converting the prediction error, such judging processing whether or not the prediction error is to be converted can be realized by a simple circuit structure or calculating processing.

The encoding processing according to the present invention can be applied to a system constructed by a plurality of equipments (e.g., host computer, interface equipment, reader, printer or the like) or can also be applied to an apparatus comprising one equipment (e.g., copy machine, facsimile machine).

The invention employed by a method whereby program codes of a software to realize the functions of the embodiments are supplied to a computer in an apparatus or system connected to various devices so as to make the devices operative in order to realize the functions of the foregoing embodiments and the various devices are operated in accordance with the programs stored in the computer of the system or apparatus is also included in the scope of the present invention.

In such a case, the program codes themselves of the software realize the functions of the foregoing embodiments and the program codes themselves and means for supplying the program codes to the computer, for example, a memory medium in which the program codes have been stored construct the present invention.

As such memory medium to store the program codes, for example, it is possible to use a floppy disk, a hard disk, an optical disk, an optomagnetic disk, a CD-ROM, a magnetic tape, a non-volatile memory card, and a ROM or the like.

It will be obviously understood that the program codes are included in the embodiments of the present invention even in not only a case where the functions of the foregoing embodiments are realized by executing the supplied program codes by the computer but also a case where the functions of the foregoing embodiments are realized in cooperation with the OS (operating system) by which the program codes operate in the computer or another application software or the like.

Further, it will also be obviously understood that the present invention also incorporates a case where the supplied program codes are stored into a memory provided for a function expansion board of a computer or a function expansion unit connected to a computer and, after that, a CPU or the like provided for the function expansion board or function expansion unit executes a part or all of the actual processes on the bases of instructions of the program codes, and the functions of the foregoing embodiments are realized by the processes.

Although the present invention has been described above with respect to the preferred embodiments, the present invention is not limited to the foregoing embodiments and many modifications and variations are possible with the spirit and scope of the appended claims.

What is claimed is:

1. An information Processing apparatus comprising:
   prediction means for predicting an objective pixel value;
   prediction error generation means for obtaining a prediction error by said prediction means;

1. An apparatus comprising:

statistics means for calculating, on the basis of a value of the prediction error, a statistical quantity of generation frequency in a plurality of cases corresponding to the value;

conversion means for converting the value of the prediction error on the basis of the statistical quantity; and entropy encode means for entropy encoding the prediction error converted by said conversion means, wherein the conversion by said conversion means is a symmetric transformation using a predetermined prediction error value as a center.

2. An apparatus according to claim 1, wherein the predetermined prediction error value which is the center of the symmetric transformation is a value other than "0".

3. An apparatus according to claim 2, the predetermined prediction error value which is the center of the symmetric transformation is "−½".

4. An apparatus according to claim 1, wherein said entropy encode means has a plurality of entropy encoding techniques.

5. An apparatus according to claim 4, wherein the plurality of entropy encoding techniques include Golomb-Rice encoding technique.

6. An apparatus according to claim 4, wherein the plurality of entropy encoding techniques include arithmetic encoding technique.

7. An apparatus according to claim 1, wherein said apparatus is a duplicating machine.

8. An apparatus according to claim 1, wherein said apparatus is a facsimile apparatus.

9. An apparatus according to claim 1, wherein said apparatus includes a host computer in a part of said apparatus.

10. An apparatus according to claim 1, wherein said apparatus includes a reader in a part of said apparatus.

11. An apparatus according to claim 1, wherein said apparatus includes a printer in a part of said apparatus.

12. An information processing apparatus comprising:

prediction means for predicting an objective pixel value;

prediction error generation means for obtaining a prediction error by said prediction means;

statistics means for calculating, on the basis of a value of the Prediction error, a statistical quantity of generation frequency in a plurality of cases corresponding to the value;

conversion means for converting the value of the prediction error on the basis of the statistical quantity;

entropy encode means for entropy encoding the prediction error converted by said conversion means; and control means for performing controlling such that the prediction error by said prediction means becomes a predetermined value other than "0".

13. An apparatus according to claim 12, wherein the predetermined value other than "0" is "−½".

14. An information processing method comprising the steps of:

predicting an objective pixel value and obtaining a prediction error;

calculating, on the basis of a value of the prediction error, a statistical quantity of generation frequency in a plurality of cases corresponding to the value; and converting the value of the prediction error on the basis of the statistical quantity, and entropy encoding the converted prediction error, wherein the conversion by said converting step is symmetric transformation using a predetermined prediction error value as a center.

15. An information processing apparatus comprising:

prediction means for predicting a prediction value of an encoding target pixel;

generation means for generating a prediction error by using the prediction value;

calculation means for calculating statistics of positive (+) and negative (−) signs of the prediction error;

sign correction means for correcting the positive and negative signs of the prediction error, on the basis of a result of the statistics calculated by said calculation means; and encode means for encoding the prediction error corrected by said sign correction means.

16. An apparatus according to claim 15, wherein the statistics of the positive and negative signs are obtained by calculating the number of the positive and negative signs for each prediction error.

17. An apparatus according to claim 15, wherein the statistics of the positive and negative signs are calculated for each state of peripheral pixels of the encoding target pixel.

18. An apparatus according to claim 15, wherein the statistics of the positive and negative signs are calculated for each state corresponding to a combination of the positive and negative signs of the prediction error, in each peripheral pixel of the encoding target pixel.

19. An apparatus according to claim 15, wherein the correction of the positive and negative signs by said sign correction means is performed by inverting the sign to be positive only in a case where the sign of the prediction error is negative.

20. An apparatus according to claim 15, wherein the encoding by said encode means is entropy encoding.

21. An apparatus according to claim 20, wherein the entropy encoding is Huffman encoding.

22. An apparatus according to claim 15, wherein said apparatus is a duplicating machine.

23. An apparatus according to claim 15, wherein said apparatus is a facsimile apparatus.

24. An apparatus according to claim 15, wherein said apparatus includes a host computer in a part of said apparatus.

25. An apparatus according to claim 15, wherein said apparatus includes a reader in a part of said apparatus.

26. An apparatus according to claim 15, wherein said apparatus includes a printer in a part of said apparatus.

27. An information processing method comprising:

a prediction step of predicting a prediction value of an encoding target pixel;

a generation step of generating a prediction error by using the prediction value;

a calculation step of calculating statistics of positive (+) and negative (−) signs of the prediction error;

a sign correction step of correcting the positive and negative signs of the prediction error, on the basis of a result of the statistics calculated in said calculation step; and an encode step of encoding the prediction error corrected in said sign correction step.

28. An information processing apparatus comprising:

prediction means for predicting an objective pixel value;

prediction error generation means for obtaining a prediction error by said prediction means;

conversion means for converting a value of the prediction error on the basis of plural prediction errors obtained by said prediction error generation means before the prediction error; and entropy encode means for entropy encoding the prediction error converted by said conversion means, wherein the conversion by said conversion means is symmetric transformation using a predetermined prediction error value as a center and wherein the value of the prediction error is "$-\frac{1}{2}$".

29. An apparatus according to claim 28, wherein said entropy encode means has a plurality of entropy encoding methods.

30. An apparatus according to claim 29, wherein the plurality of entropy encoding methods include a Golomb-Rice encoding method.

31. An apparatus according to claim 29, wherein the plurality of entropy encoding methods include an arithmetic encoding method.

32. An information processing method comprising:

a prediction step of predicting an objective pixel value;

a prediction error generation step of obtaining a prediction error by said prediction step;

a conversion step of converting a value of the prediction error on the basis of plural prediction errors obtained by said prediction error generation step before the prediction error; and an entropy encode step of entropy encoding the prediction error converted by said conversion step, wherein the conversion by said conversion step is symmetric transformation using a predetermined prediction error value as a center and wherein the value of the prediction error is "$-\frac{1}{2}$".

33. An apparatus according to claim 28, wherein said apparatus is a duplicating machine.

34. An apparatus according to claim 28, wherein said apparatus is a facsimile apparatus.

35. An apparatus according to claim 28, wherein said apparatus includes a host computer in a part of said apparatus.

36. An apparatus according to claim 28, wherein said apparatus includes a reader in a part of said apparatus.

37. An apparatus according to claim 28, wherein said apparatus includes a printer in a part of said apparatus.

* * * * *

UNITED STATES PATENT AND TRADEMARK OFFICE
CERTIFICATE OF CORRECTION

PATENT NO. : 5,960,116

DATED : September 28, 1999

INVENTOR(S) : HIROSHI KAJIWARA

It is certified that error appears in the above-identified patent and that said Letters Patent is hereby corrected as shown below:

COLUMN 1

Line 17, "the" should read --a--.

COLUMN 7

Line 40, "as" should read --is--; and
Line 45, "of" should read --of the--.

COLUMN 11

Line 50, "e" should read --be--.

COLUMN 12

Line 64, "Processing" should read --processing--.

COLUMN 13

Line 14, "the" should --wherein the--; and
Line 42, "Prediction" should --prediction--.

UNITED STATES PATENT AND TRADEMARK OFFICE
CERTIFICATE OF CORRECTION

PATENT NO.    : 5,960,116
DATED         : September 28, 1999
INVENTOR(S)   : HIROSHI KAJIWARA It is certified that error appears in the above-identified patent and that said Letters Patent is hereby corrected as shown below:

COLUMN 16

Line 4, "wherein" should --¶ wherein--.

Signed and Sealed this

Fifth Day of December, 2000

Attest:

Attesting Officer

Q. TODD DICKINSON
Director of Patents and Trademarks